United States Patent
Baldemair et al.

(10) Patent No.: US 12,120,621 B2
(45) Date of Patent: Oct. 15, 2024

(54) ENABLING MULTIPLE NUMEROLOGIES IN A NETWORK

(71) Applicant: Telefonaktiebolaget LM Ericsson (publ), Stockholm (SE)

(72) Inventors: Robert Baldemair, Solna (SE); Sorour Falahati, Stockholm (SE); Daniel Larsson, Lund (SE); Stefan Parkvall, Bromma (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 18/099,694

(22) Filed: Jan. 20, 2023

(65) Prior Publication Data
US 2023/0156642 A1    May 18, 2023

Related U.S. Application Data

(63) Continuation of application No. 15/500,326, filed as application No. PCT/SE2016/051083 on Nov. 3, 2016, now abandoned.

(51) Int. Cl.
*H04W 56/00* (2009.01)
*H04L 5/00* (2006.01)
(Continued)

(52) U.S. Cl.
CPC ......... *H04W 56/0015* (2013.01); *H04L 5/005* (2013.01); *H04L 5/0053* (2013.01);
(Continued)

(58) Field of Classification Search
CPC .............. H04W 56/0015; H04W 48/12; H04L 27/26025; H04L 5/005; H04L 5/0053; H04L 5/0092; H04J 11/0069
See application file for complete search history.

(56) References Cited

U.S. PATENT DOCUMENTS 9,432,138 B2    8/2016    Kang et al.
2008/0233941 A1    9/2008    Jen
(Continued)

FOREIGN PATENT DOCUMENTS

CN    103907325 A    7/2014
CN    104104482 A    10/2014
(Continued)

OTHER PUBLICATIONS

3GPP TS 36.331 V14.0.0 (Sep. 2016), Technical Specification; 3rd Generation Partnership Project; Technical Specification Group Radio Access Network; Evolved Universal Terrestrial Radio Access (E-UTRA); Radio Resource Control (RRC); Protocol specification (Release 14) (Year: 2016).*

(Continued)

*Primary Examiner* — Joseph A Bednash
(74) *Attorney, Agent, or Firm* — Murphy, Bilak & Homiller, PLLC

(57) ABSTRACT

There is presented a method for enabling multiple numerologies in a network. The method is performed by a user equipment (UE) and comprises receiving system information in a first search space on a broadcast channel with a first numerology, determining a second search space from the received system information, and receiving further information in the second search space with a second numerology. A UE, a base station, a computer program, and a computer program device are also presented.

9 Claims, 4 Drawing Sheets

(51) Int. Cl.
  *H04L 27/26* (2006.01)
  *H04W 48/12* (2009.01)
  *H04J 11/00* (2006.01)
(52) U.S. Cl.
  CPC ...... *H04L 5/0092* (2013.01); *H04L 27/26025* (2021.01); *H04W 48/12* (2013.01); *H04J 11/0069* (2013.01)

(56) References Cited

U.S. PATENT DOCUMENTS

| | | | |
|---|---|---|---|
| 2014/0036853 | A1 | 2/2014 | Kim et al. |
| 2014/0177556 | A1 | 6/2014 | Pan et al. |
| 2016/0088595 | A1 | 3/2016 | You et al. |
| 2018/0054800 | A1* | 2/2018 | Yeo ................... H04L 27/2657 |

FOREIGN PATENT DOCUMENTS

| | | |
|---|---|---|
| EP | 2683098 A2 | 1/2014 |
| EP | 2713658 A1 | 4/2014 |
| EP | 3304982 B1 | 3/2019 |
| RU | 2573249 C2 | 1/2016 |
| WO | 2014165678 A2 | 10/2014 |
| WO | 2016130175 A1 | 8/2016 |

OTHER PUBLICATIONS

LG Electronics, "Overall structure of DL control transmission for NR", 3GPP TSG RAN WG1 Meeting #86bis, Lisbon, Portugal, Oct. 10-14, 2016, R1-1609273 (Year: 2016).*
Huawei et al., "Discussion on downlink control channel design", 3GPP TSG RAN WG1 Meeting #86bis, Lisbon, Portugal, Oct. 10-14, 2016, R1-1609432 (Year: 2016).*
Samsung, Discussion on numerology aspects of NR synchronization signal, 3GPP TSG RAN WG1 Meeting #86, Gothenburg, Sweden, Aug. 22-26, 2016, R1-166795 (Year: 2016).*
Panasonic, Use of multiple numerologies in NR, 3GPP TSG RAN WG1 Meeting #86, Gothenburg, Sweden, Aug. 22-26, 2016, R1-167439 (Year: 2016).*
"3rd Generation Partnership Project; Technical Specification Group Radio Access Network; Evolved Universal Terrestrial Radio Access (E-UTRA); Radio Resource Control (RRC); Protocol specification (Release 14)", 3GPP TS 36.331 V14.0.0, Sep. 2016, 644 pages.
3GPP, "3rd Generation Partnership Project; Technical Specification Group Radio Access Network; Study on New Radio (NR) Access Technology Physical Layer Aspects (Release 14)", 3GPP TR 38.802 V0.3.0 (Oct. 2016), Oct. 2016, 1-43.
"A Framework for Initial Access for NR", 3GPP TSG-RAN WG1 #86bis, R1-1610351, InterDigital Communications, Lisbon, Portugal, Oct. 10-14, 2016, 4 pages.
"Control channel aspects for enhanced coverage MTC UE", 3GPP TSG RAN WG1 Meeting #74bis, R1-134651, Ericsson, Guangzhou, China, Oct. 7-11, 2013, pp. 1-5.
"Discussion on Downlink Control Channel Design", 3GPP TSG RAN WG1 Meeting #86bis, R1-1609432, Huawei, HiSilicon, Lisbon, Portugal, Oct. 10-14, 2016, 5 pages.
"DL Control Channel Framework for NR", 3GPP TSG-RAN WG1 #86bis, R1-1610089, InterDigital Communications, Lisbon, Portugal, Oct. 10-14, 2016, 5 pages.
"Feasibility of Mixing Numerology in an OFDM System", 3GPP TSG RAN WG1 Meeting #84 bis, R1-163224, Ericsson, Apr. 11-15, 2016, 1-7.
"Impact of Multiplexing Multiple Numerologies on Initial Access", 3GPP TSG RAN WG1 Meeting #86, R1-167673, ASUSTek, Gothenburg, Sweden, Aug. 22-26, 2016, 5 pages.
"Initial views on DL control channel design", 3GPP TSG RAN WG1 Meeting #86bis, R1-1610058, NTT DOCOMO, Lisbon, Portugal, Oct. 10-14, 2016, 7 pages.
"Overall Structure of DL Control Transmission for NR", 3GPP TSG RAN WG1 Meeting #86bis, R1-1609273, LG Electronics, Lisbon, Portugal, Oct. 10-14, 2016, 5 pages.
"PBCH design considerations", 3GPP TSG-RAN WG1 NR AdHoc, R1-1700788, Qualcomm Incorporated, Spokane, USA, Jan. 16-20, 2017, pp. 1-6.
"Random Access and Support for Multiple Numerologies for NR", 3GPP TSG-RAN WG1 #86bis, R1-1610352, InterDigital Communications, Lisbon, Portugal, Oct. 10-14, 2016, 5 pages.
"Scalable Numerology for New RAT", 3GPP TSG RAN WG1 Meeting #85, R1-165316, Nanjing, China, May 23-27, 2016, 6 pages.
"UE Support for Multiple Numerologies for NR", 3GPP TSG-RAN WG1 #86bis, R1-1610022, InterDigital Communications, Lisbon, Portugal, Oct. 10-14, 2016, 5 pages.
"Use of multiple numerologies in NR", 3GPP TSG RAN WG1 Meeting #86, R1-167439, Panasonic, Gothenburg, Sweden, Aug. 22-26, 2016, pp. 1-9.

* cited by examiner

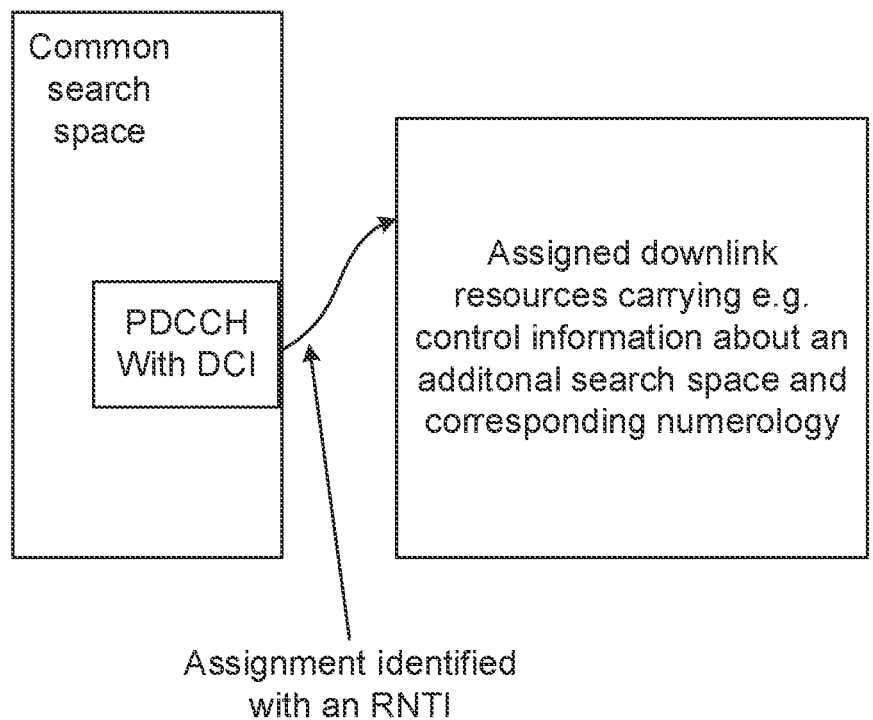
Fig. 5
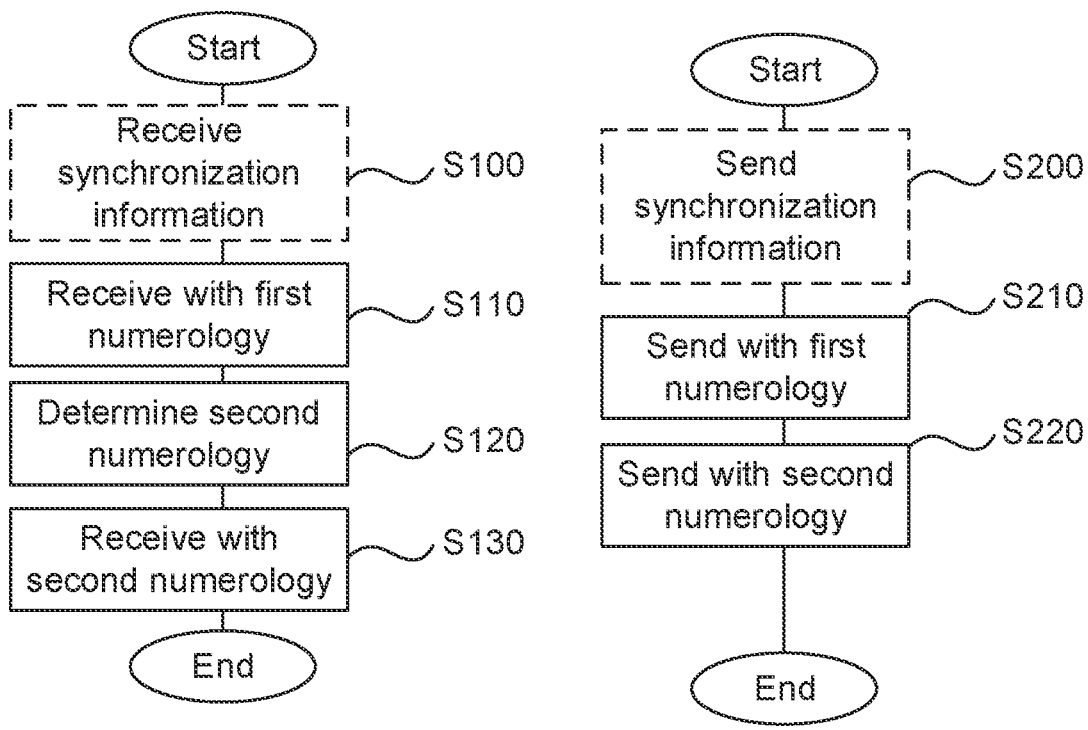
Fig. 6A
Fig. 6B

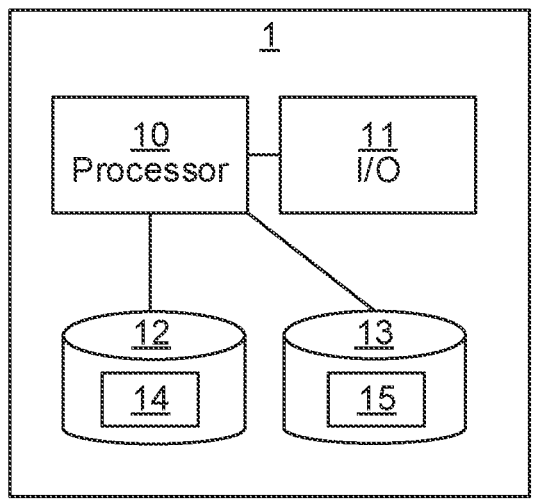
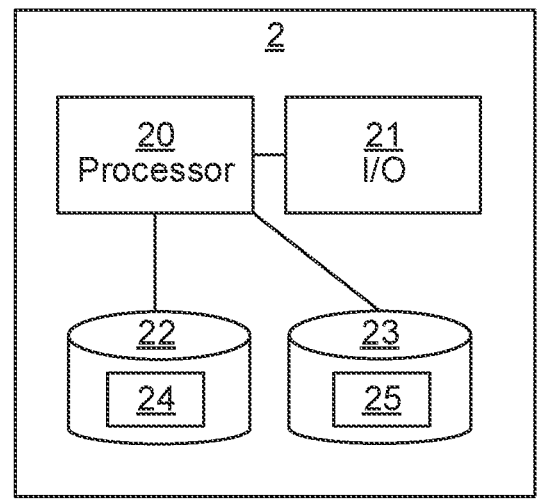
Fig. 7    Fig. 8
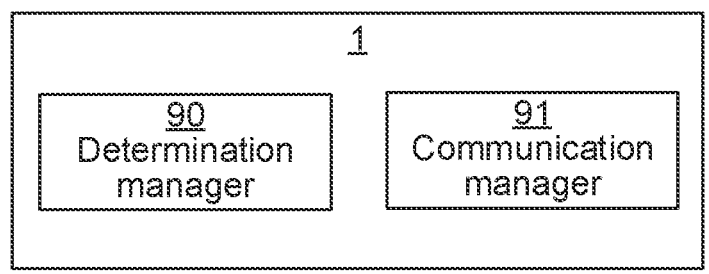
Fig. 9
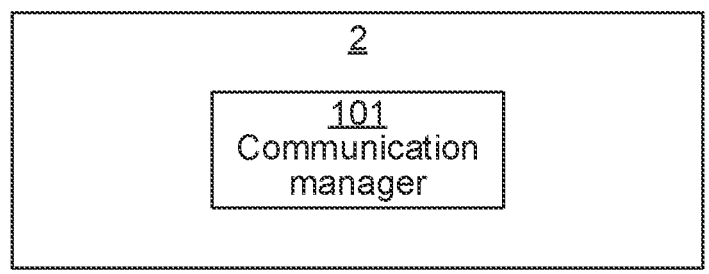
Fig. 10

ENABLING MULTIPLE NUMEROLOGIES IN A NETWORK

RELATED APPLICATIONS

This application is a continuation of U.S. patent application Ser. No. 15/500,326 filed 30 Jan. 2017, which is a U.S. National Phase Application of PCT/SE2016/051083 filed 3 Nov. 2016. The entire contents of each aforementioned application is incorporated herein by reference.

TECHNICAL FIELD

The invention relates to a method for enabling multiple numerologies in a network, as well as a user equipment, a base station, a computer program and a computer program device of the network.

BACKGROUND

The fifth generation of mobile telecommunications and wireless technology is not yet fully defined but in an advanced draft stage within 3rd Generation Partnership Project (3GPP). It includes work on 5G New Radio (NR) Access Technology. Long term evolution (LTE) terminology is used in this disclosure in a forward looking sense, to include equivalent 5G entities or functionalities although a different term is specified in 5G. A general description of the agreements on 5G NR Access Technology so far is contained in 3GPP technical report (TR) 38.802 v0.3.0 (2016-10), of which a draft version has been published as R1-1610848.

In 3GPP, there is an ongoing study item that looks into a NR interface for 5G. Terms for denoting this new and next generation technology have not yet converged, so the terms NR and 5G will be used interchangeably.

One of the first major decisions that the 3GPP work-group RAN1 needs to take for NR concerns is what is often denoted with the terms "numerology" and "frame structure". In 3GPP RAN1, the term numerology is used to determine important numeric parameters that describe some rather fundamental aspects of the OFDM radio interface, such as subcarrier spacing. OFDM symbol length, cyclic prefix length, number of symbols per subframe or slot, subframe length, and frame length. Some of these terms could also fall under the term frame structure, such as e.g. frame length, number of subframe per frame, subframe length, and location and number of symbols in a slot, frame or subframe that carry control information, and location of channels that carry data. In NR a subframe is 1 ms and establishes a 1 ms clock. Transmissions use slots or mini-slots. A slot consists of 7 or 14 symbols, 7 symbols for subcarrier spacings less than or equal to 60 kHz and 14 symbols for subcarrier spacings greater than 60 kHz.

In addition, the term frame structure can comprise a variety of additional aspects that reflect the structure of frames, subframes and slots, for example the positioning and density of reference signals (pilot signals), placement and structure of control channels, location and length of guard time for uplink to downlink switching (and vice versa) for time division-duplexing (TDD), and time-alignment. Generally, numerology and frame structure encompass a set of fundamental aspects and parameters of the radio interface.

LTE supports a single sub-carrier spacing of 15 kHz. For some other parameters in LTE, there is some additional flexibility. For example, it is possible to configure the length of the cyclic prefix and the size of the control region within a subframe. Similarly, LTE can support multiple different frame structures. e.g. for frequency division-duplexing (FDD), TDD, and Narrowband Internet of Things (NB-IoT), respectively.

3GPP TSG RAN WG1 has recently agreed that that it shall be possible support mixed sub-carrier spacing on the same carrier in NR. The feasibility of mixed subcarrier spacing was studied e.g. in 3GPP contribution R1-163224, where it was shown that the interference between non-orthogonal sub-carriers can be mitigated successfully.

SUMMARY

An object of embodiments presented herein is how to enable mixed numerologies in the 50 NR technology.

According to a first aspect there is presented a method for enabling multiple numerologies in a network. The method is performed by a user equipment (UE) and comprises receiving system information in a first search space on a broadcast channel with a first numerology, determining a second search space from the received system information, and receiving further information in the second search space with a second numerology.

The first numerology may be different from the second numerology. From the point of view of the UE executing the method of the first aspect, the case where the first and second numerologies are different is supported but is not a prerequisite for operation of the UE. The UE may as well support and function in a situation the first and second numerologies are equal or equivalent, according to a configuration applicable at a given point in time. Put differently, the second numerology is configurable without being restricted by the first numerology, or without dependence on properties of the first numerology.

The broadcast channel may be a physical broadcast channel (PBCH).

The step of receiving system information may further comprise detecting system information.

The method may further comprise receiving synchronization information prior to receiving the broadcast channel. Based on the reception of the synchronization information received on one or multiple synchronization channels, the UE may deduce the numerology of the search space or region of the broadcast channel.

The second numerology may be indicated in the received system information.

The second search space may be UE specific.

The second search space may be a common search space.

The step of determining may further comprise determining a third search space having a third numerology.

According to a second aspect there is presented a method for enabling multiple numerologies in a network. The method is performed by a base station (BS) and comprises sending system information in a first search space on a broadcast channel with a first numerology and sending further information in a second search space with a second numerology.

The first numerology may be different from the second numerology.

The broadcast channel may be a physical broadcast channel (PBCH).

The method may further comprise sending synchronization information for a broadcast channel.

According to a third aspect there is presented a UE for enabling multiple numerologies in a network. The UE comprises a processor and a computer program product. The computer program product stores instruction that, when executed by the processor, causes the UE to receive system information in a first search space on a broadcast channel with a first numerology, determine a second search space from the received system information, and to receive further information in the second search space with a second numerology.

According to a fourth aspect there is presented a BS for enabling multiple numerologies in a network. The BS comprises a processor and a computer program product. The computer program product stores instruction that, when executed by the processor, causes the BS to send system information in a first search space on a broadcast channel with a first numerology, and to send further information in a second search space with a second numerology.

According to a fifth aspect there is presented a UE for enabling multiple numerologies in a network. The UE comprises a communication manger and a determination manager. The communication manager is for receiving system information in a first search space on a broadcast channel with a first numerology, and for receiving further information in the second search space with a second numerology. The determination manager is for determining a second search space from the received system information.

According to a sixth aspect there is presented a BS for enabling multiple numerologies in a network. The BS comprises a communication manager for sending system information in a first search space on a broadcast channel with a first numerology, and for sending further information in a second search space with a second numerology.

According to a seventh aspect there is presented a computer program for enabling multiple numerologies in a network. The computer program comprises computer program code which, when run on a user equipment (UE), causes the UE to receive system information in a first search space on a broadcast channel with a first numerology, determine a second search space from the received system information, and to receive further information in the second search space with a second numerology.

According to an eighth aspect there is presented a computer program for enabling multiple numerologies in a network. The computer program comprises computer program code which, when run on a BS, causes the BS to send system information in a first search space on a broadcast channel with a first numerology, and to send further information in a second search space with a second numerology.

According to a ninth aspect there is presented a computer program product comprising a computer program and a computer readable storage means on which the computer program is stored.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The invention is now described, by way of example, with reference to the accompanying drawings, on which:

FIG. 5 is a schematic diagram illustrating search spaces according to an embodiment presented herein;

FIGS. 6A-6B are flowcharts illustrating methods for embodiments presented herein;

FIGS. 7-8 are schematic diagrams illustrating some components of devices presented herein; and FIGS. 9-10 are schematic diagrams showing functional modules of devices presented herein.

DETAILED DESCRIPTION

It is noted that the invention may be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

Herein the terms user equipment (UE), terminal, handset etc. interchangeably to denote a device that communicates with a network infrastructure. The term should not be construed as to mean any specific type of device, i.e. it applies to them all, and the embodiments described herein are applicable to all devices that use the concerned solution to solve the problems as described. Similarly, a base station (BS) is intended to denote the node in the network infrastructure that communicates with the UE. Different names may be applicable, such as NB, eNB, gNB, and the functionality of the BS may also be distributed in various ways. For example, there could be a radio head terminating parts of the radio protocols and a centralized unit that terminates other parts of the radio protocols. The term BS will refer to all alternative architectures that can implement the concerned invention, and no distinction between such implementations will be made.

Figure 2:
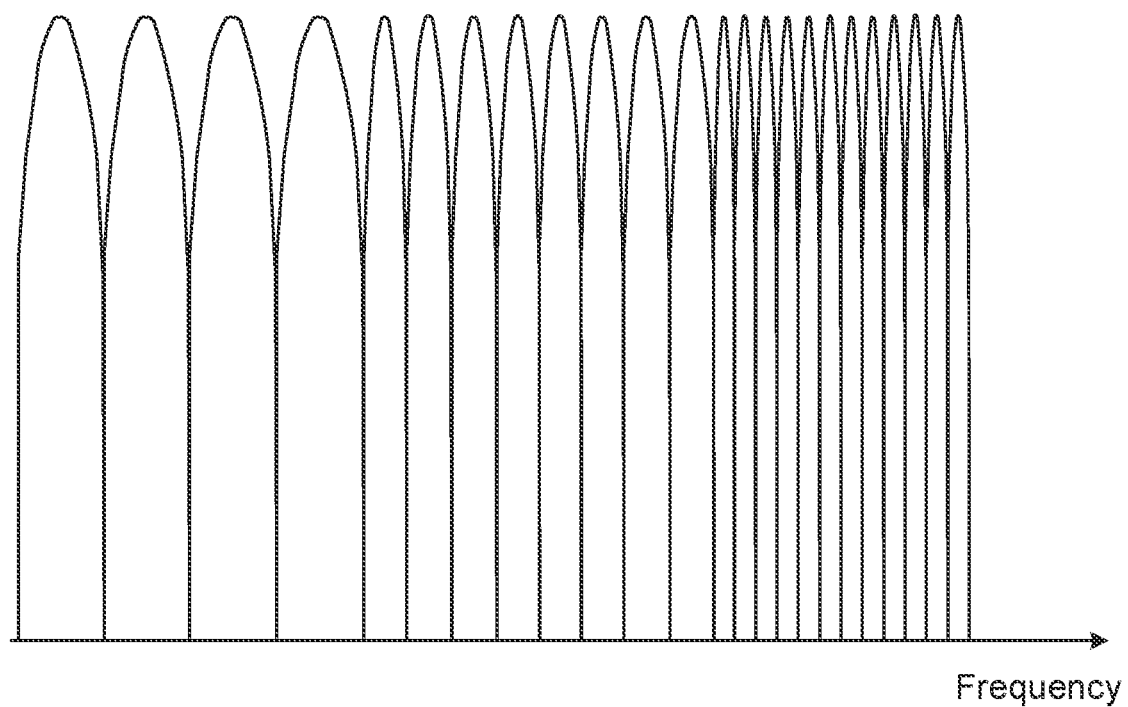
FIG. 2 is a schematic diagram illustrating frequency multiplexing of sub-band regions with different sub-carrier spacings.

FIG. 2 provides a schematic illustration of frequency multiplexing of three sub-band regions with different numerology. In the illustration, there are three different numerologies provided, such as three different carrier frequency portions that use different subcarrier spacing.

It should be noted that many other parameters are likely to be dependent, at least in part, on the subcarrier spacing. For example, the symbol length in OFDM is a function of the sub-carrier spacing. The slot length, which is defined in number of symbols or milliseconds, depends for example on selected numerology. Common to many of these parameters is that a receiver needs to know, or will at least greatly benefit from knowing beforehand, what parameters are used by the transmitter when transmitting a signal to the receiver. For example, a UE benefits from knowing the sub-carrier spacing used by a transmitting BS, so that the UE can reduce the hypotheses of different sub-carrier spacings used by the BS when trying to decode a signal. This applies to many parameters, including but not limited to the ones described above. Some parameters can be either identified by blind decoding, but if there are too many unknown parameters, the identification task will place a heavy processing burden on the UE.

The term "numerology" will herein denote these parameters or at least some of the parameters. More precisely, in a system where one of the enumerated parameters is not configurable, numerology may be understood as not including non-configurable parameters. Occasionally, the expression "a numerology" may denote a set of values to be assigned to the configurable parameters.

Current agreements in RAN1 includes a subcarrier spacing that scales according to $2^m \times 15$ kHz, with m an integer or preferably m≥0. It is also agreed that a physical resource block consists of 12 subcarriers. A subframe duration is also fixed to 1 ms. A slot consists of 7 or 14 symbols, 7 symbols for subcarrier spacings less than or equal to 60 kHz and 14 symbols for subcarrier spacings greater than 60 kHz.

As already noted, 3GPP TSG RAN WG1 has agreed that 5G NR should support multiple numerologies within a carrier. Having different numerologies within a carrier can be attractive e.g. to simultaneously meet requirements for low latency for one subset of UEs, and at the same time support good coverage for another set of UEs. In more generally terms, different sub-bands on a carrier using different numerologies can then be used for transmissions to and from the different UEs, where the different UEs have different demands on service quality.

However, problems also arise with this flexibility in supporting multiple numerologies on a carrier. In particular a receiver, such as a UE, would greatly benefit from knowing beforehand what numerology that is to be assumed when trying to decode a signal from a transmitter. One challenge is that, when the UE first finds and connects to a cell, it does not necessarily know what numerology is applied on the carrier in the cell, and in particular, it does not know if there are sub-band portions that apply different numerologies.

For the UE, it may be difficult or demanding to implement a solution where the UE knows little or nothing about the downlink signal structure. i.e. the numerology, and has to try out a large number of different assumptions through blind decoding before it can decode the signal from the BS. This problem is particularly severe when a UE is to establish a connection with a BS, i.e. when the UE has not yet received much specific information from the BS about how the BS intends to transmit signals to the UE.

A common and known solution to the problem of informing UEs about cell or carrier parameters is to broadcast such information in system information from the BS to UEs within a coverage area of the BS. By that method, basic parameters such as cell bandwidth, frame structure, cyclic prefix etc. can be made available periodically to all UEs within the proximity of the BS. However, this approach has some significant drawbacks, including:

1. Successful reception of the concerned system information requires that the UE already knows some basic information about the numerology where the system information is transmitted. In LTE, for example, the UE is aware of the specified constant sub-carrier spacing of 15 kHz and does not have to hypothesize in this regard. In LTE, based on synchronization information, the UE will also know the timing and the location of certain basic system information, such as master information block (MIB) and then subsequently system information block type1 (SIB1), so that it can subsequently gain more information about e.g. the frame structure in the cell.
2. The carrier on which system information is broadcast will be subject to considerable load. Broadcast system information has to be repeated relatively frequently, and if there is intent to provide a significant flexibility by having many configurable numerology parameters, the approach would likely to result in significant overhead.
3. At high frequencies, the realization of signaling by broadcasting methods over a large area can be very difficult, if not impossible, as the propagation conditions may require either beamforming or very prudent coding and modulation to ensure that the broadcast information can be received by UEs regardless of their location.

Thus, there is a need to provide a solution that can support or enable multiple numerology scenarios, distribution of fundamental parameters without placing excessive load on a broadcast channel, so that a UE can quickly and unambiguously learn what numerologies are supported in different sub-band portions of a carrier. There is also a need for a solution for forward compatibility, so that new numerologies expressed by physical layer parameters and e.g. new channel and frame structure designs can be put to use in sub-band portions of a carrier. By such an approach, the backwards-compatible sub-portion of the carrier can be reduced to a minimum, and new sub-band solutions can be put to use in an efficient way.

Technologies addressing the aforementioned problems as outlined above are presented.

Embodiments are presented intended to enable a UE to acquire information about sub-band numerologies on a carrier with minimal overhead including low processing requirements.

Embodiments are also presented for a BS that signals information to a UE about sub-bands with specific numerologies, wherein the solution provides great flexibility, low overhead and future compatibility required e.g. when new transmission solutions are introduced in later revisions of the network.

Synchronization signals may be received over a channel or channels with a known numerology. Alternatively, a set of available numerologies is limited, or preferably significantly limited, so that the burden for decoding synchronization signals is manageable. The UE then may decode a physical broadcast channel (PBCH), which may have a numerology that is fixed, or otherwise based on the detection and information deduced from the synchronization. Information on the PBCH may carry information about common and/or additional search spaces, wherein the information may include information about the numerology applied on these search spaces. Data, such as system information, scheduled on the common search space may further contain references to UE-specific search spaces, and respective numerologies. A first search space may further provide a UE with scheduling information carrying an indication of a second additional search space with another numerology. The scheduling information may in particular indicate the numerology of the second additional search space.

The proposed solution can support multiple numerologies of fundamental parameters without placing an excessive load on a broadcast channel, so that a UE can quickly and unambiguously learn what numerologies are supported in different sub-band portions of a carrier. The solution is also forward compatible, so that new numerologies expressed e.g. by physical layer parameters and e.g. new channel and frame structure design can be put to use in sub-band portions of a carrier, even if they are not present in the first version or versions of a deployment, and the new channel and frame structure is developed in the future. By such an approach, once new channel and frame structures are developed, the old backwards-compatible sub-portion of the carrier can be reduced to a minimum serving only those remaining UEs that does not support the new channel and frame structure, and new sub-band solutions can be put to use in an efficient way.

An example of a broadcast channel is a PBCH carrying system information. Often, a PBCH is modelled to carry broadcast messages on a broadcast transport channel (BCH). i.e. the traffic on BCH is mapped on PBCH.

First, a UE acquires information about how and where to receive a broadcast channel. The information about how (numerology) and where (physical resources) to receive the broadcast channel can e.g. be based on the reception of synchronization information.

Reception of synchronization information provides some very basic information of the carrier cell structure and timing, and in one alternative, the numerology of the PBCH transmission is provided within the synchronization channel or channels that the UE acquires initially. For example, the UE may be required to test a few hypotheses of synchronization channel numerology, and based on the reception of the synchronization channel, the UE can deduce the numerology or set of numerologies that may apply to the reception of the broadcast channel. However, and alternatively, some or all parameters, i.e. numerology, defining where and how to receive the broadcast channel could be hard coded into the UE, e.g. based on some parameters agreed in a standard specification or the like; the parameters need not be configurable or variable during normal operation of the UE.

For example, it could be defined that the UE will use e.g. a sub-carrier spacing of 15 kHz and/or a specific slot format and/or cyclic prefix and/or specific location of the PBCH when reading the information carried on the PBCH. In an alternative, the sub-carrier spacing and other parameters dependent on the subcarrier spacing are defined and programmed into the UE, such that the parameters are dependent on the carrier frequency. For example, it could be defined or pre-agreed that a carrier implemented below a frequency f1 has a sub-carrier spacing of sc1 for PBCH, a carrier implemented between frequencies f1 and f2, has sub-carrier spacing of sc2 for PBCH, and so on.

The same or a similar approach may also apply to one or several of the following: the timing of the PBCH, i.e. its periodicity, the location of the PBCH on the frequency and time-domain placement, the resource blocks that carry PBCH, and the modulation and coding of the PBCH.

On the PBCH, the UE can now receive some very fundamental information of the system, i.e. system information. However, to avoid excessive load on the PBCH, which could occur if PBCH also carries numerology information for all sub-bands, the invention uses the following approach. The sub-band carrying PBCH will hereafter also be called control sub-band.

Information on PBCH may now include a reference to search spaces and/or carrier regions for receiving additional information, such as control channels and data. As used herein, the term "search spaces" also includes carrier regions. The BCH information may for example include a reference to a common search space and/or one or multiple additional search spaces. The additional search space may be common or UE-specific. The BCH information may further include information on the numerology to be used in the referenced search space or search spaces. The information on the numerology may, for example, provide a reference to a table of different numerologies, wherein the table identifies what numerology the UE should apply when decoding information on the search space or search spaces. Alternatively, the BCH data may include information on whether the search space or search spaces apply the same numerology as BCH, or if the numerology is different. Other information could also be provided, or the format could e.g. be the value of integer m in the expression $2^m \times 15$ kHz, to identify a specific numerology. The information regarding the additional search spaces may also include information about the location of the search space in the time-frequency resource grid.

The common search space may also be defined to have the same numerology as BCH, to further reduce the signaling on BCH. In the common search space, the UE may be scheduled to receive additional information about one or several additional search spaces or other information.

In such an embodiment, the information provided in information scheduled at the common search space may include a reference to one or several additional search spaces, in which case the additional search spaces may use different numerologies. Such information could be scheduled and received on a data region of a frame or subframe, wherein the data is scheduled by a radio network temporary identifier (RNTI) on the common search space.

A search space may refer to locations (which in LTE are called control channel elements) where a UE can expect to find downlink control channels (PDCCH) that are of relevance for the UE. A common search space is a search space that many, or even all, UEs on a carrier needs to monitor, at least intermittently. Such a common search space may carry e.g. scheduling of paging information (using a paging-RNTI in LTE), or further system information (scheduled by a system information-RNTI in LTE), or e.g. random access responses. In this common search space, the UE may be scheduled to receive information about additional search spaces. The information about additional search spaces may include information about the numerology of the additional search space. In one embodiment, this information is carried in system information mapped onto the data region of a frame, subframe or slot.

Figure 3:
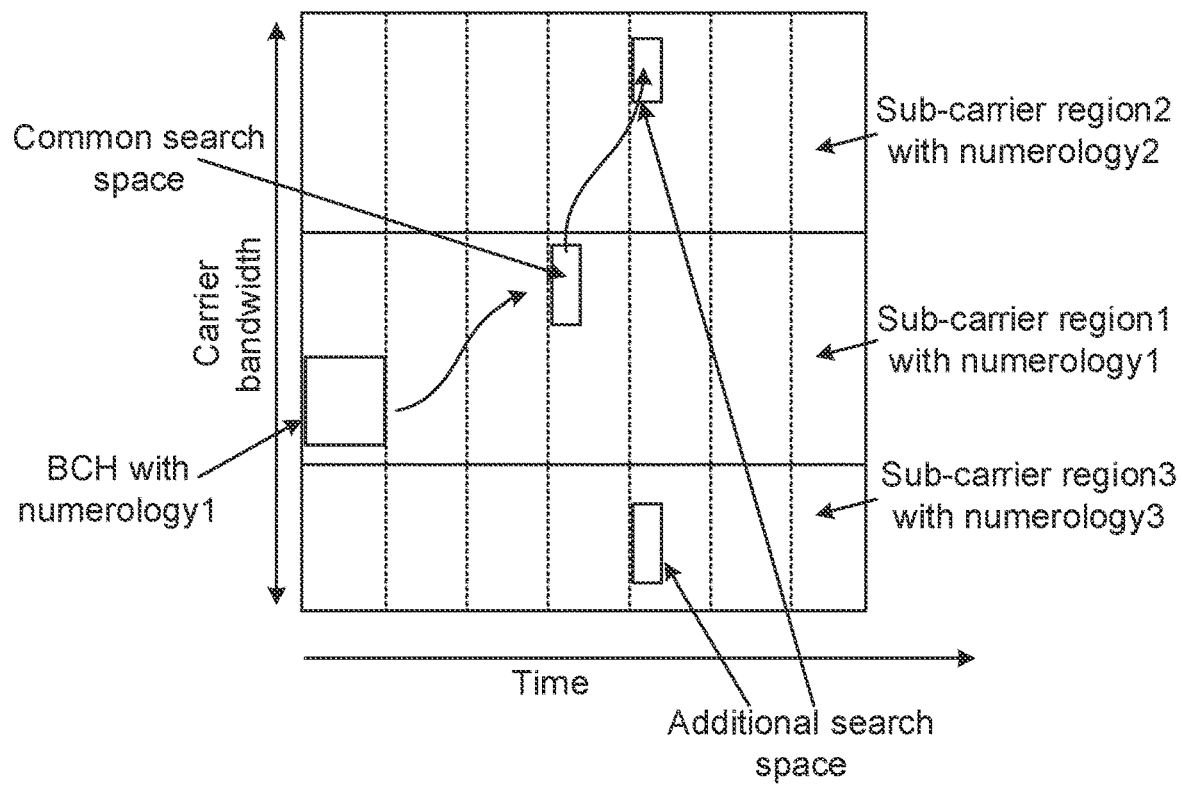
FIG. 3 is a schematic diagram illustrating search spaces according to an embodiment presented herein.

A schematic illustration of an embodiment is provided in FIG. 3. In FIG. 3, the time-relationship and size of different illustrated regions are only schematic. According to the embodiment, the BCH is transmitted from the BS and is received by the UE using a first numerology, numerology1. As illustrated, the BCH information may include a reference to a common search space. The BCH information may further include information as described above on the numerology of the common search space. In FIG. 3, the numerology of the common search space is the same as the numerology of the BCH, i.e. numerology1 on sub-carrier region1. Next, the UE receives, in or associated with the common search space, information about an additional search space. In the illustration, the additional search space is now implemented using a second numerology, numerology2 on sub-carrier region2. FIG. 3 also includes a third search space, which is not assigned to this UE. For illustration purposes, it is shown that this third search space may implement a third numerology, numerology3 on sub-carrier region3.

In the embodiment illustrated in FIG. 3, a reference to the additional, second search space is provided in the common search space. However, a reference to an additional, second search space may also be provided directly in the information carried on BCH, as illustrated in FIG. 4.

Figure 4:
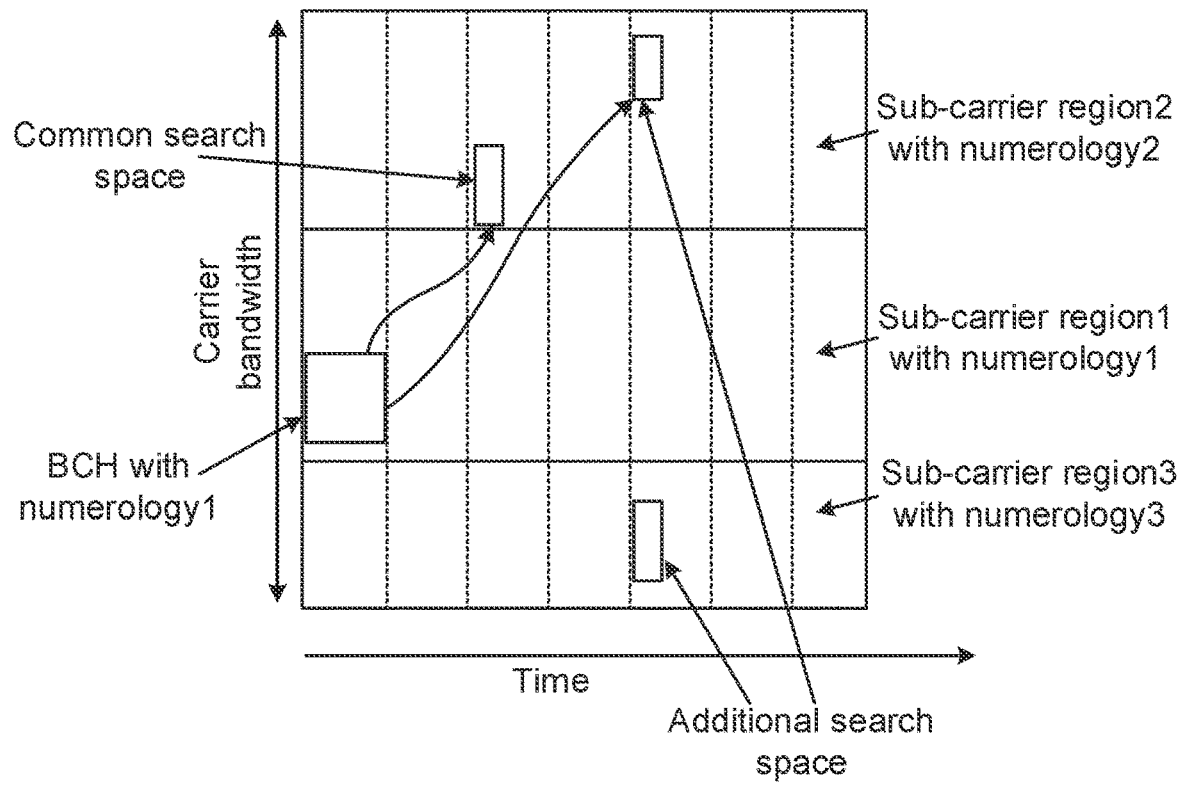
FIG. 4 is a schematic diagram illustrating search spaces according to an embodiment presented herein.

In FIG. 4, it is exemplified that also the common search space may implement a different numerology, numerology2 on sub-carrier region2, than the numerology of the BCH, numerology1 on sub-carrier region1. It should further be noted that all the illustrated regions (search spaces and BCH) may occur periodically, or even in every subframe or slot (not illustrated). The periodicity may be different for the relevant search spaces.

A benefit of providing information about the numerology of the additional search space or spaces from via the common search space is that the information can be provided on a shared channel, scheduled by assignments, such as downlink control information (DCI) on PDCCH, as explained below. The UE searches for (data) scheduling assignments on the common search space. When it identifies a scheduling assignment relating to an RNTI intended for this purpose, the UE finds an allocation of downlink resources, i.e., a scheduling command and corresponding scheduling of downlink data. For example, this data can be control information, e.g. identified as system information, carried on the data region of a frame, subframe or slot. The downlink data region may carry information about the additional search space and its numerology, as explained before or other information. This is illustrated in FIG. 5.

In one solution, the scheduling assignment is directed to a plurality of UEs, using an RNTI that is common to the plurality of UE's, such as a System Information RNTI (SI-RNTI). In another solution, the UE is directed to the additional search space using an assignment directed specifically to this UE, i.e. using e.g. the UEs Cell-RNTI (C-RNTI), wherein the C-RNTI is allocated to this UE. In this latter solution, the UE may first need to establish a connection to the network, by which it can receive such UE specific control information about the additional search space or spaces via dedicated signaling, such as Radio Resource Control (RRC) signaling. The latter approach may reduce the need for repetitive control information on the carrier, as UEs are assigned to receive the aforementioned control information only at times when specifically needed.

Figure 1:
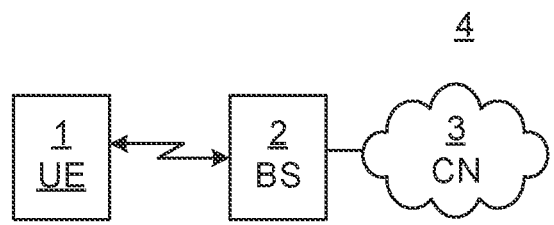
FIG. 1 is a schematic diagram illustrating an environment where embodiments presented herein can be applied.

A network 4, wherein embodiments described herein can be implemented is presented in FIG. 1. A UE 1 is wirelessly connectable to a BS 2. The BS 2 is connected to a core network (CN) 3.

A method, according to an embodiment, for enabling multiple numerologies in a network is presented with reference to FIG. 6A. The method is performed by a UE and comprises receiving S110 system information in a first search space on a broadcast channel with a first numerology, determining S120 a second search space from the received system information, and receiving S130 further information in the second search space with a second numerology.

The first numerology may be different from the second numerology.

The broadcast channel may be a physical broadcast channel (PBCH).

The step of receiving may further comprises detecting system information.

The method may further comprise receiving S100 synchronization information for a broadcast channel prior to the step of receiving S110.

The second numerology may be indicated in the received system information.

The second search space may be UE-specific.

The second search space may be a common search space.

The step of determining S120 may further comprise determining a third search space having a third numerology.

A method for enabling multiple numerologies in a network is presented with reference to FIG. 6B. The method is performed by a BS and comprises sending S210 system information in a first search space on a broadcast channel with a first numerology and sending S220 further information in a second search space with a second numerology.

The method may further comprise sending S200 synchronization information for a broadcast channel.

A UE for enabling multiple numerologies in a network is presented with reference to FIG. 7. The UE 1 comprises a processor 10, and a computer program product 12, 13. The computer program product stores instruction that, when executed by the processor, causes the UE to receive S110 system information in a first search space on a broadcast channel with a first numerology, determine S120 a second search space from the received system information, and to receive S130 further information in the second search space with a second numerology.

A BS for enabling multiple numerologies in a network is presented with reference to FIG. 8. The BS 2 comprises a processor 20, and a computer program product 22, 23. The computer program product stores instruction that, when executed by the processor, causes the BS to send S210 system information in a first search space on a broadcast channel with a first numerology, and to send S220 further information in a second search space with a second numerology.

A UE for enabling multiple numerologies in a network is presented with reference to FIG. 9. The UE 1 comprises a communication manger 91 and a determination manager 90. The communication manager is for receiving S110 system information in a first search space on a broadcast channel with a first numerology, and for receiving S130 further information in the second search space with a second numerology. The determination manager is for determining S120 a second search space from the received system information.

A BS for enabling multiple numerologies in a network is presented with reference to FIG. 10. The BS 2 comprises a communication manager 101 for sending S210 system information in a first search space on a broadcast channel with a first numerology, and for sending S220 further information in a second search space with a second numerology.

A computer program 14, 15 for enabling multiple numerologies in a network is presented. The computer program comprises computer program code which, when run on a UE, causes the UE 1 to receive S110 system information in a first search space on a broadcast channel with a first numerology, determine (S120) a second search space from the received system information, and to receive S130 further information in the second search space with a second numerology.

A computer program 24, 25 for enabling multiple numerologies in a network is presented. The computer program comprises computer program code which, when run on a BS, causes the BS 2 to send S210 system information in a first search space on a broadcast channel with a first numerology, and to send S220 further information in a second search space with a second numerology.

A computer program product 12, 13 (FIG. 7), 22, 23 (FIG. 8) comprising a computer program 14, 15 (FIG. 7), 24, 25 (FIG. 8) and a computer readable storage means on which the computer program 14, 15, 24, 25 is stored, is also presented.

FIG. 7 is a schematic diagram showing some components of the UE 1. The processor 10 may be provided using any combination of one or more of a suitable central processing unit, CPU, multiprocessor, microcontroller, digital signal processor. DSP, application specific integrated circuit etc., capable of executing software instructions of a computer program 14 stored in a memory. The memory can thus be considered to be or form part of the computer program product 12. The processor 10 may be configured to execute methods described herein with reference to FIG. 6A.

The memory may be any combination of read and write memory. RAM, and read only memory, ROM. The memory may also comprise persistent storage, which, for example, can be any single one or combination of magnetic memory, optical memory, solid state memory or even remotely mounted memory.

A second computer program product 13 in the form of a data memory may also be provided, e.g. for reading and/or storing data during execution of software instructions in the processor 10. The data memory can be any combination of read and write memory, RAM, and read only memory. ROM, and may also comprise persistent storage, which, for example, can be any single one or combination of magnetic memory, optical memory, solid state memory or even remotely mounted memory. The data memory may e.g. hold other software instructions 15, to improve functionality for the UE 1.

The UE 1 may further comprise an input/output (I/O) interface 11 including e.g. a user interface. The WD 1 may further comprise a receiver configured to receive signaling from other nodes, and a transmitter configured to transmit signaling to other nodes (not illustrated). Other components of the UE 1 are omitted in order not to obscure the concepts presented herein.

FIG. 9 is a schematic diagram showing functional blocks of the UE 1. The modules may be implemented as only software instructions such as a computer program executing in the cache server or only hardware, such as application specific integrated circuits, field programmable gate arrays, discrete logical components, transceivers, etc. or as a combination thereof. In an alternative embodiment, some of the functional blocks may be implemented by software and other by hardware. The modules correspond to the steps in the methods illustrated in FIG. 6A, comprising a determination manager unit 90 and a communication manager unit 91. In the embodiments where one or more of the modules are implemented by a computer program, it shall be understood that these modules do not necessarily correspond to process modules but can be written as instructions according to a programming language in which they would be implemented, since some programming languages do not typically contain process modules.

The determination manger 90 is for enabling multiple numerologies in a network. This module corresponds to the determine step S1210 of FIG. 6A. This module can e.g. be implemented by the processor 10 of FIG. 7, when running the computer program.

The communication manger 91 is for enabling multiple numerologies in a network. This module corresponds to the receive step S100, the receive step S110 and the receive step S130 of FIG. 6A. This module can e.g. be implemented by the processor 10 of FIG. 7, when running the computer program.

FIG. 8 is a schematic diagram showing some components of the base station 2. A processor 20 may be provided using any combination of one or more of a suitable central processing unit. CPU, multiprocessor, microcontroller, digital signal processor, DSP, application specific integrated circuit etc., capable of executing software instructions of a computer program 24 stored in a memory. The memory can thus be considered to be or form part of the computer program product 22. The processor 20 may be configured to execute methods described herein with reference to FIG. 6B.

The memory may be any combination of read and write memory, RAM, and read only memory, ROM. The memory may also comprise persistent storage, which, for example, can be any single one or combination of magnetic memory, optical memory, solid state memory or even remotely mounted memory.

A second computer program product 23 in the form of a data memory may also be provided, e.g. for reading and/or storing data during execution of software instructions in the processor 20. The data memory can be any combination of read and write memory, RAM, and read only memory. ROM, and may also comprise persistent storage, which, for example, can be any single one or combination of magnetic memory, optical memory, solid state memory or even remotely mounted memory. The data memory may e.g. hold other software instructions 25, to improve functionality for the BS 2.

The BS 2 may further comprise an input/output, I/O, interface 21 including e.g. a user interface. The BS 2 may further comprise a receiver configured to receive signaling from other nodes, and a transmitter configured to transmit signaling to other nodes (not illustrated). Other components of the BS 2 are omitted in order not to obscure the concepts presented herein.

FIG. 10 is a schematic diagram showing functional blocks of the BS 2. The modules may be implemented as only software instructions such as a computer program executing in the cache server or only hardware, such as application-specific integrated circuits, field programmable gate arrays, discrete logical components, transceivers, etc. or as a combination thereof. In an alternative embodiment, some of the functional blocks may be implemented by software and other by hardware. The modules correspond to the steps in the methods illustrated in FIG. 6B, comprising a communication manager unit 101. In the embodiments where one or more of the modules are implemented by a computer program, it shall be understood that these modules do not necessarily correspond to process modules but can be written as instructions according to a programming language in which they would be implemented, since some programming languages do not typically contain process modules.

The communication manger 101 is for enabling multiple numerologies in a network. This module corresponds to the send step S200, the send step S210, and the send step S220 of FIG. 6B. This module can e.g. be implemented by the processor 20 of FIG. 8, when running the computer program.

The invention has mainly been described above with reference to a few embodiments. However, as is readily appreciated by a person skilled in the art, other embodiments than the ones disclosed above are equally possible within the scope of the invention, as defined by the appended patent claims.

What is claimed is:

1. A method for enabling multiple numerologies corresponding to different subcarrier spacings in a wireless network, the method being performed by a user equipment (UE) and comprising:
   determining, based on a carrier frequency used by a base station of the wireless network, a first numerology to use for receiving a broadcast channel transmitted by the base station;
   receiving the broadcast channel according to the first numerology, wherein a time-domain placement of the broadcast channel is determined by the first numerology;
   determining, from system information provided on the broadcast channel, a common search space and a second numerology used by the base station for transmitting control information in the common search space, the second numerology different than the first numerology;

receiving, according to the second numerology, a Physical Downlink Control Channel (PDCCH) in the common search space; and determining, from further system information provided on the PDCCH, an additional search space for receiving a further PDCCH.

2. The method according to claim 1, wherein the further PDCCH is associated with a third numerology that is different from the second numerology.

3. The method according to claim 1, further comprising receiving the further PDCCH in the additional search space and obtaining corresponding control information therefrom.

4. The method according to claim 1, further comprising receiving synchronization information for the broadcast channel, prior to receiving on the broadcast channel.

5. The method according to claim 1, wherein the broadcast channel is received by the UE in a first subcarrier region, the PDCCH is received in a second subcarrier region that contains the common search space, and the further PDCCH is received in a third subcarrier region that contains the additional search space.

6. A method for enabling multiple numerologies corresponding to different subcarrier spacings in a wireless network, the method being performed by a base station (BS) and comprising:

transmitting a broadcast channel via a carrier having a carrier frequency, the broadcast channel transmitted using a first numerology that is associated with the carrier frequency and providing system information indicating a common search space and a second numerology that is different than the first numerology, wherein a time-domain placement of the broadcast channel is determined by the first numerology; and transmitting a Physical Downlink Control Channel (PDCCH) for a user equipment (UE), the PDCCH transmitted in the common search space using the second numerology and providing further system information indicating to the UE an additional search space for transmitting a further PDCCH for the UE.

7. The method according to claim 6, further comprising transmitting the further PDCCH for the UE in the additional search space, using a third numerology that is different than the second numerology.

8. A user equipment (UE) supporting multiple numerologies corresponding to different subcarrier spacings in a wireless network, the UE comprising:

a processor; and a memory storing computer program instructions that, when executed by the processor, cause the UE to:

determine, based on a carrier frequency used by a base station of the wireless network, a first numerology to use for receiving a broadcast channel transmitted by the base station;

receive broadcast channel according to the first numerology, wherein a time-domain placement of the broadcast channel is determined by the first numerology;

determine, from system information provided on the broadcast channel, a common search space and a second numerology used by the base station for transmitting control information in the common search space, the second numerology different than the first numerology;

receive, according to the second numerology, a Physical Downlink Control Channel (PDCCH) in the common search space; and determine, from further system information providing on the PDCCH, an additional search space for receiving a further PDCCH.

9. A base station (BS) supporting multiple numerologies corresponding to different subcarrier spacings in a wireless network, the BS comprising:

a processor; and a memory storing computer program instructions that, when executed by the processor, cause the BS to:

transmit a broadcast channel via a carrier having a carrier frequency, the broadcast channel transmitted using a first numerology that is associated with the carrier frequency and providing system information indicating a common search space and a second numerology that is different than the first numerology, and wherein a time-domain placement of the broadcast channel is determined by the first numerology; and transmit a Physical Downlink Control Channel (PDCCH) for a user equipment (UE), the PDCCH transmitted in the common search space using the second numerology and providing further system information indicating to the UE an additional search for transmitting a further PDCCH for the UE.

* * * * *

UNITED STATES PATENT AND TRADEMARK OFFICE
CERTIFICATE OF CORRECTION

PATENT NO. : 12,120,621 B2
APPLICATION NO. : 18/099694
DATED : October 15, 2024
INVENTOR(S) : Baldemair et al.

It is certified that error appears in the above-identified patent and that said Letters Patent is hereby corrected as shown below:

In the Specification

In Column 1, Line 7, delete "2017," and insert -- 2017, now abandoned, --, therefor.

In Column 1, Line 42, delete "spacing." and insert -- spacing, --, therefor.

In Column 2, Line 1, delete "structures." and insert -- structures, --, therefor.

In Column 2, Line 4, delete "that that" and insert -- that --, therefor.

In Column 2, Line 5, delete "support" and insert -- to support --, therefor.

In Column 2, Line 14, delete "50 NR" and insert -- 5G NR --, therefor.

In Column 2, Line 28, delete "the" and insert -- where the --, therefor.

In Column 3, Line 16, delete "manger" and insert -- manager --, therefor.

In Column 3, Line 64, delete "applied:" and insert -- applied; --, therefor.

In Column 5, Line 16, delete "generally" and insert -- general --, therefor.

In Column 5, Line 31, delete "structure." and insert -- structure, --, therefor.

In Column 7, Line 3, delete "(BCH)." and insert -- (BCH), --, therefor.

In Column 8, Line 21, delete "downlink" and insert -- physical downlink --, therefor.

In Column 8, Line 23, delete "all." and insert -- all, --, therefor.

Signed and Sealed this
Twelfth Day of August, 2025

Coke Morgan Stewart
*Acting Director of the United States Patent and Trademark Office*

CERTIFICATE OF CORRECTION (continued)
U.S. Pat. No. 12,120,621 B2

In Column 10, Line 23, delete "manger" and insert -- manager --, therefor.

In Column 10, Line 62, delete "processor." and insert -- processor, --, therefor.

In Column 11, Line 2, delete "memory." and insert -- memory, --, therefor.

In Column 11, Line 11, delete "memory." and insert -- memory, --, therefor.

In Column 11, Line 44, delete "manger" and insert -- manager --, therefor.

In Column 11, Line 49, delete "manger" and insert -- manager --, therefor.

In Column 11, Line 58, delete "unit." and insert -- unit, --, therefor.

In Column 12, Line 8, delete "memory." and insert -- memory, --, therefor.

In Column 12, Line 40, delete "manger" and insert -- manager --, therefor.